(12) United States Patent
Dal Pra'

(10) Patent No.: US 6,698,567 B2
(45) Date of Patent: Mar. 2, 2004

(54) ELECTRIC CONTROL DEVICE FOR A MOTOR-DRIVEN DERAILLEUR FOR BICYCLES

(75) Inventor: Giuseppe Dal Pra', Zane (IT)

(73) Assignee: Campagnolo Srl, Vicenza (IT)

( * ) Notice: Subject to any disclaimer, the term of this patent is extended or adjusted under 35 U.S.C. 154(b) by 0 days.

(21) Appl. No.: 10/165,117

(22) Filed: Jun. 7, 2002

(65) Prior Publication Data

US 2003/0019712 A1 Jan. 30, 2003

(30) Foreign Application Priority Data

Jun. 8, 2001 (IT) ........................................ TO01A0555

(51) Int. Cl.⁷ ............................................ B62M 25/08
(52) U.S. Cl. ...................... 192/217; 192/226; 74/502.2; 74/489
(58) Field of Search ................................ 74/502.2, 489, 74/473.12, 473.13; 192/217, 226; 474/78, 80, 82; 280/238, 261; 200/61.87, 61.91

(56) References Cited

U.S. PATENT DOCUMENTS

| | | | | |
|---|---|---|---|---|
| 4,071,892 A | * | 1/1978 | Genzling | 701/200 |
| 4,143,557 A | * | 3/1979 | Wakebe et al. | 474/80 |
| 4,946,425 A | * | 8/1990 | Buhlmann | 474/80 |
| 5,358,451 A | * | 10/1994 | Lacombe et al. | 474/78 |
| 5,470,277 A | | 11/1995 | Romano | |
| 5,479,776 A | | 1/1996 | Romano | |
| 5,480,356 A | * | 1/1996 | Campagnolo | 474/70 |
| 5,494,307 A | * | 2/1996 | Anderson | 280/236 |
| 5,514,041 A | * | 5/1996 | Hsu | 474/78 |
| 5,653,649 A | | 8/1997 | Watarai | |
| 5,728,017 A | * | 3/1998 | Bellio et al. | 474/70 |
| 5,865,454 A | * | 2/1999 | Campagnolo | 280/238 |
| 6,015,036 A | | 1/2000 | Fukuda | |

* cited by examiner

Primary Examiner—Saul Rodriguez
(74) Attorney, Agent, or Firm—Volpe and Koenig, P.C.

(57) ABSTRACT

An electric control device for a motor-driven derailleur for bicycles includes a supporting body fixed to a handlebar of a bicycle, a supporting body, a pair of electric switches to control the gear change carried by the supporting body, and a gear change lever that can be manually operated to control a first of said switches. The gear change lever comprises a first part connected to the supporting body so as to consent shift of the gear change lever between a position at rest and an operating position, and a second part hinged to the first part.

50 Claims, 12 Drawing Sheets

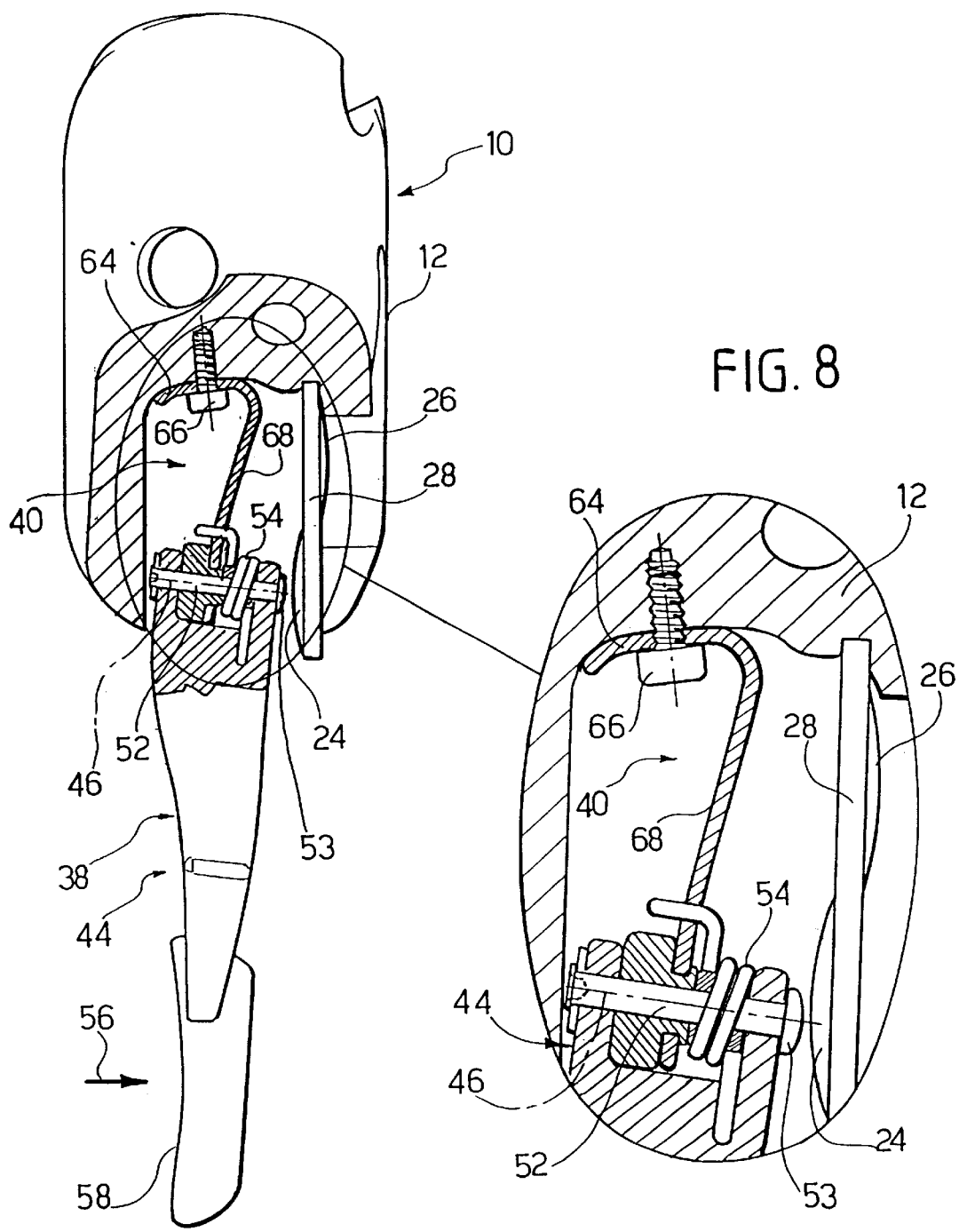

FIG. 9
FIG. 10
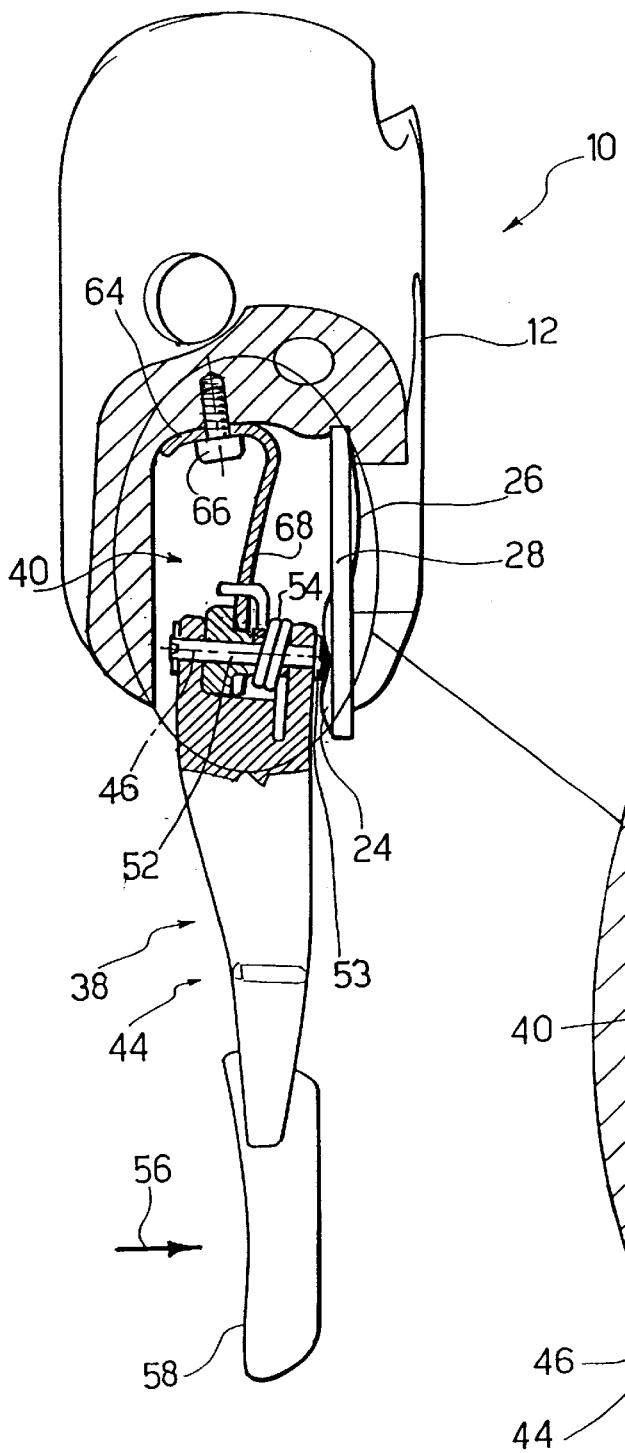
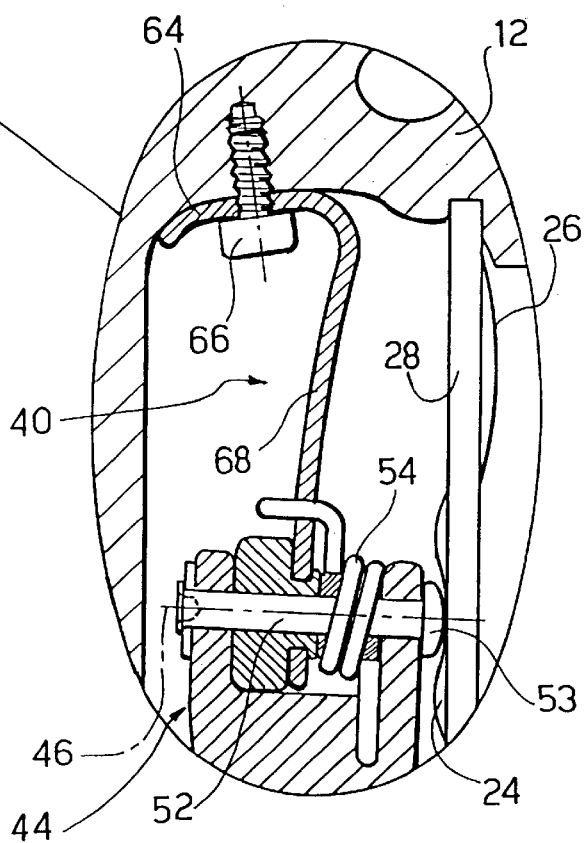

ELECTRIC CONTROL DEVICE FOR A MOTOR-DRIVEN DERAILLEUR FOR BICYCLES

The present invention relates to an electric control device for a motor-driven derailleur for bicycles.

More precisely, the invention relates to a control device of the type comprising:
- a supporting body provided with means for fixing it to a bicycle handlebar,
- a brake control lever hinged to the supporting body,
- a pair of electric switches to control gear change carried by the supporting body, and
- a gear change lever that can be operated manually to control at least one of said switches.

A control device of the type specified above is known from the U.S. Pat. No. 5,470,277 by the same Applicant, which describes an electric control device provided with two switches positioned in a supporting body fixed to the handlebar of a bicycle. A first switch is operated by a gear change lever positioned immediately behind the brake control lever and a second switch is operated by a push button positioned on a side wall of the supporting body. The two electric switches may be used to operate in opposite directions an electric motor associated with a derailleur for bicycles. Operation of the derailleur motor in a first direction shifts the chain in a first direction, for example towards higher speed gears and operation in the opposite direction shifts the chain in the opposite direction, for example towards lower speed gears.

The document U.S. Pat. No. 6,015,036 describes an electric control device for a bicycle including a gear change switch supported by the brake lever. A second gear change switch may be positioned near the brake lever. This solution is less advantageous than the one in which both switches are positioned on the supporting body, as it is necessary to take an electric connection to the brake lever which pivots in relation to the supporting body.

The object of the present invention is to provide an electric control device of an improved type which is ergonomic, of simple construction and more functional than prior art devices.

According to the present invention, this object is attained by a control device with the characteristics contained in claim 1.

Figure 1:
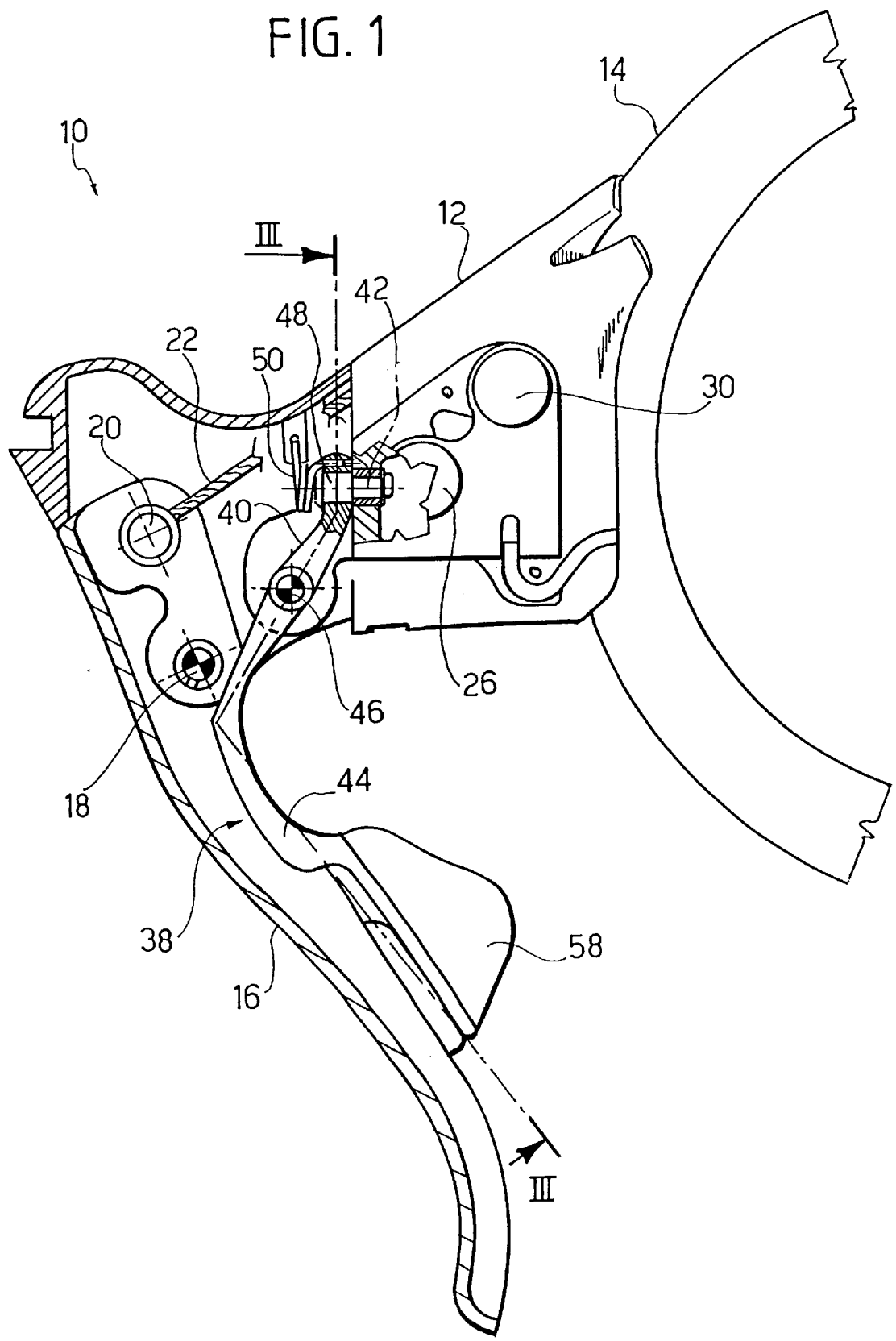
Figure 2:
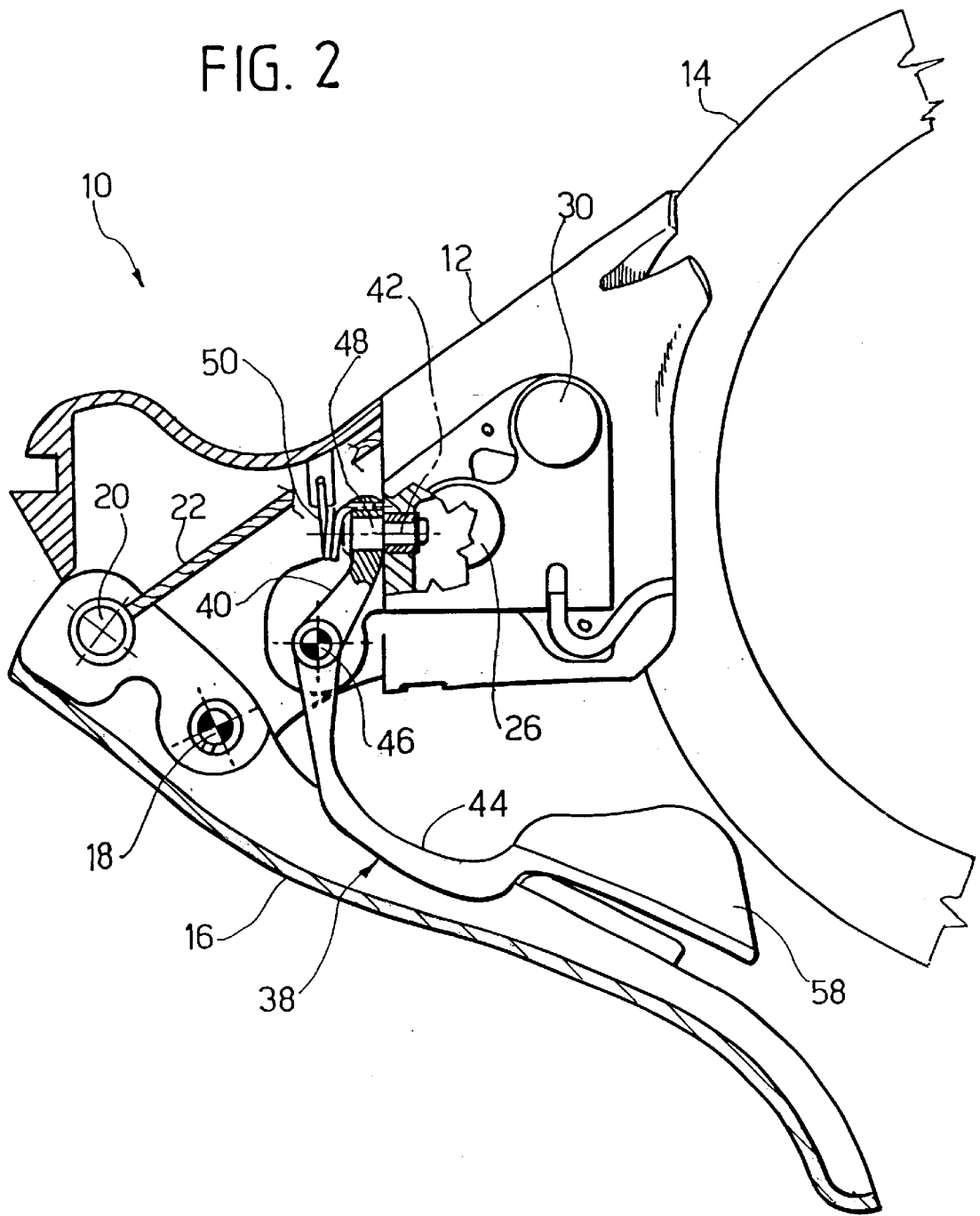
Figure 3:
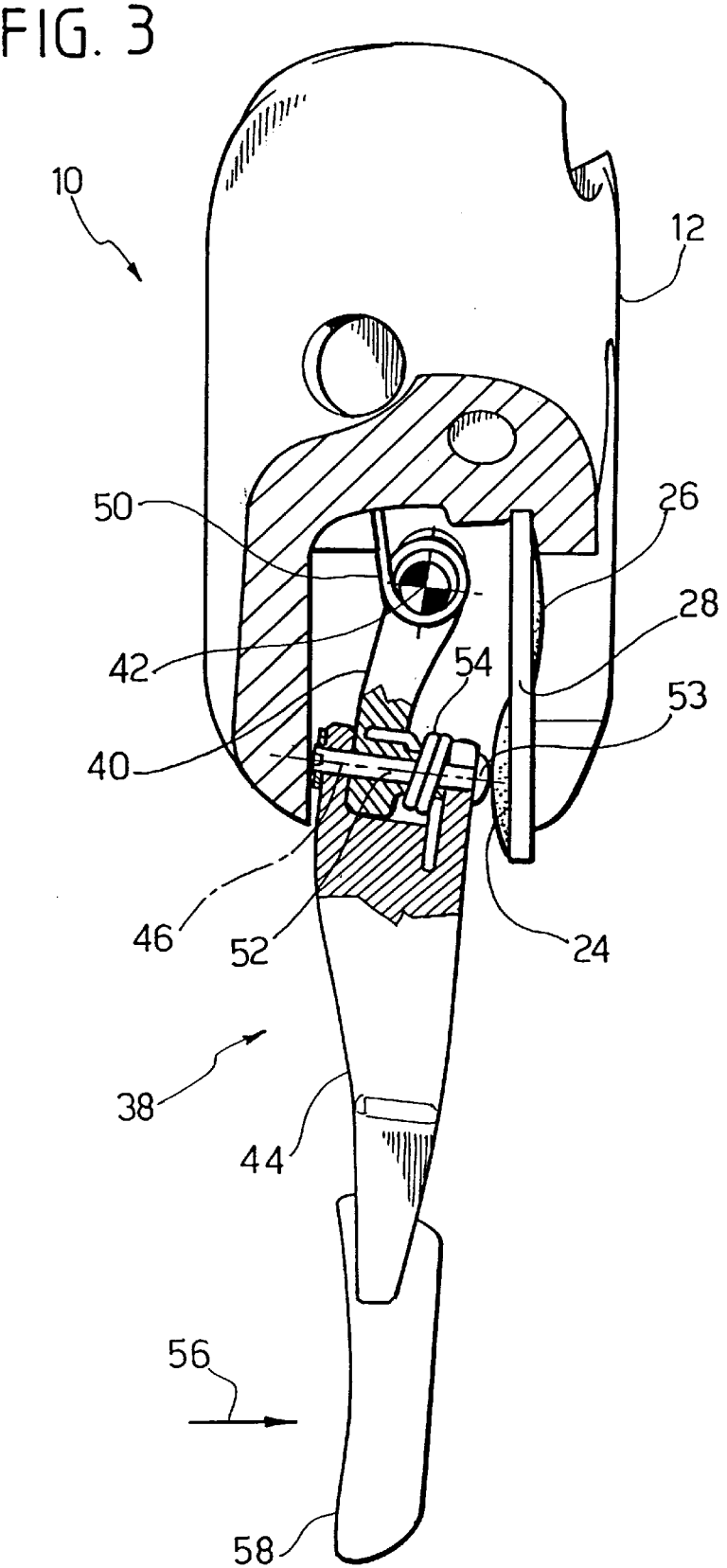
Figure 4:
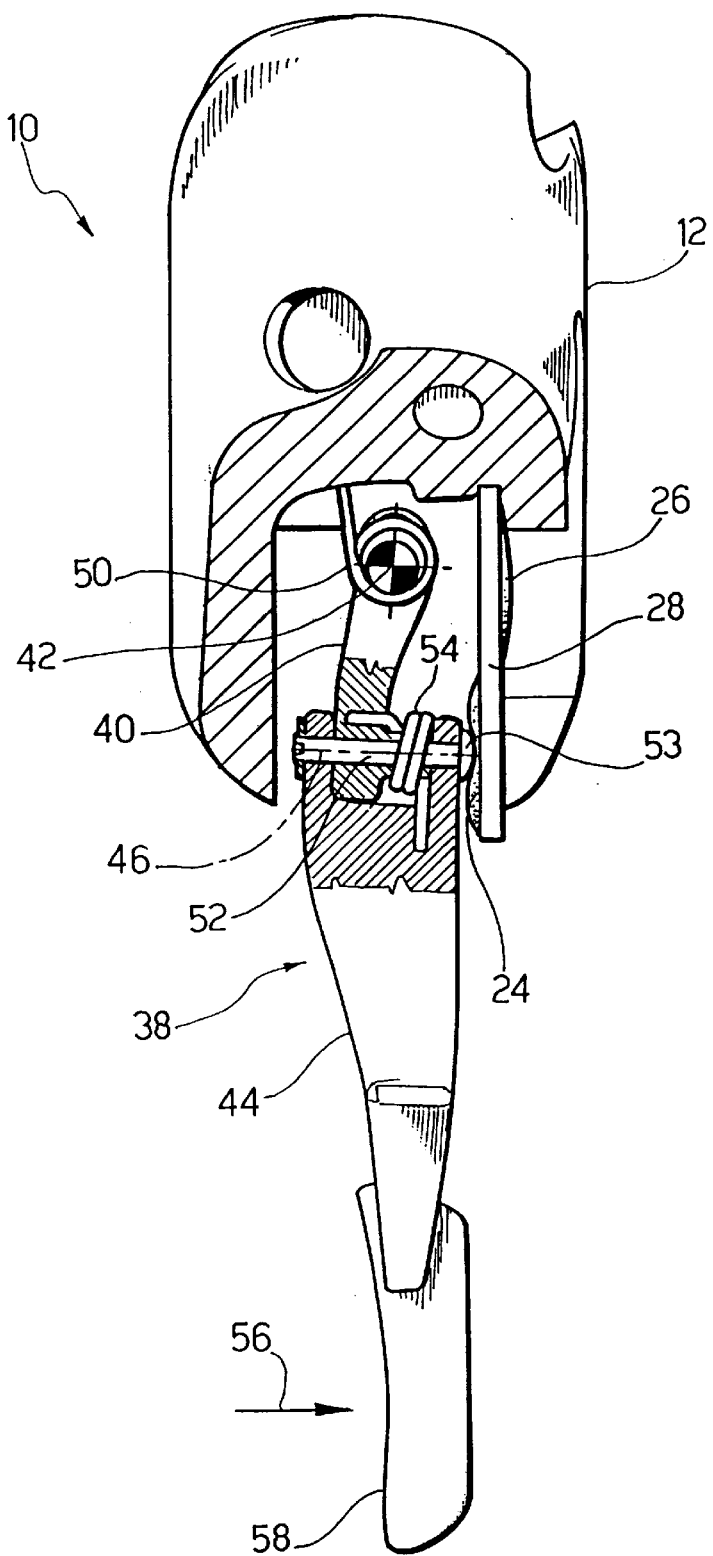
Figure 5:
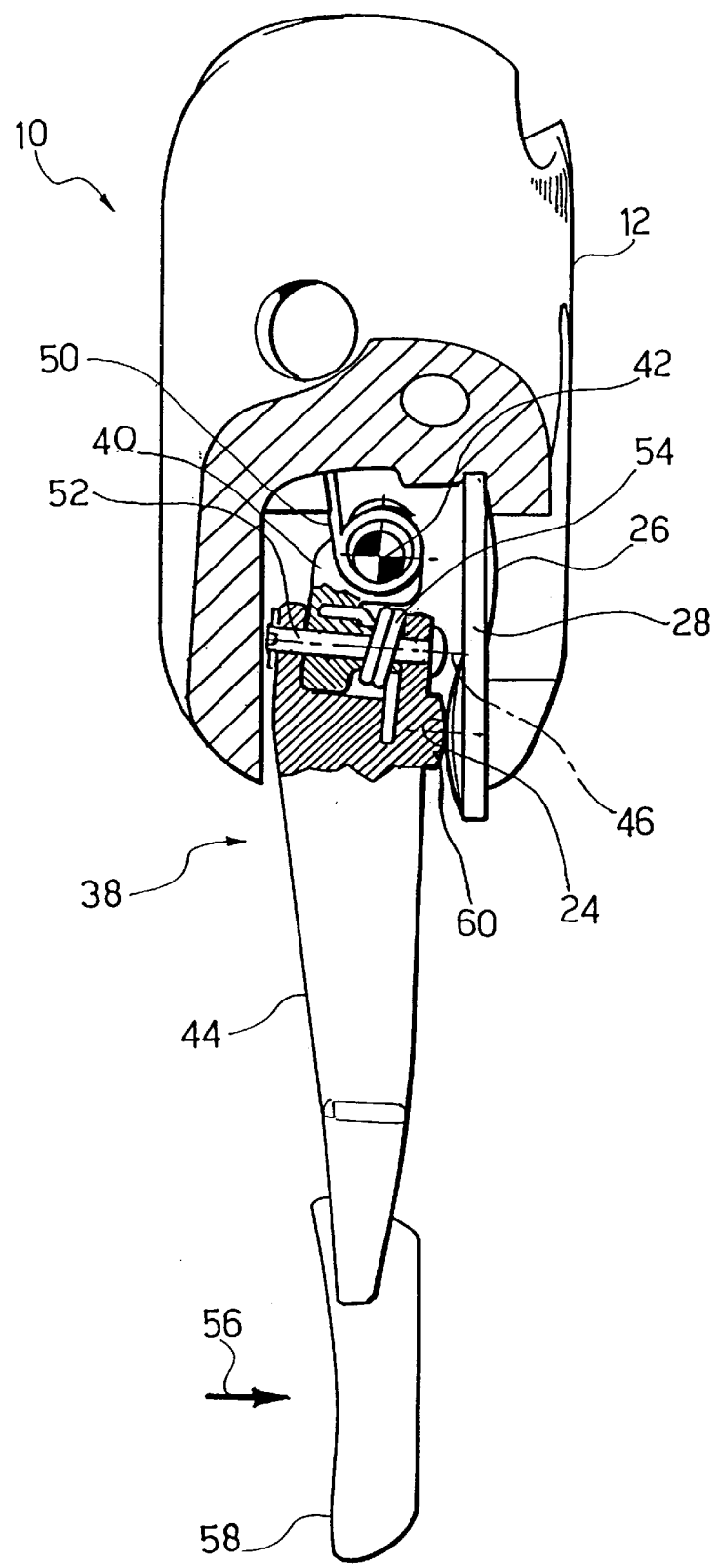
Figure 6:
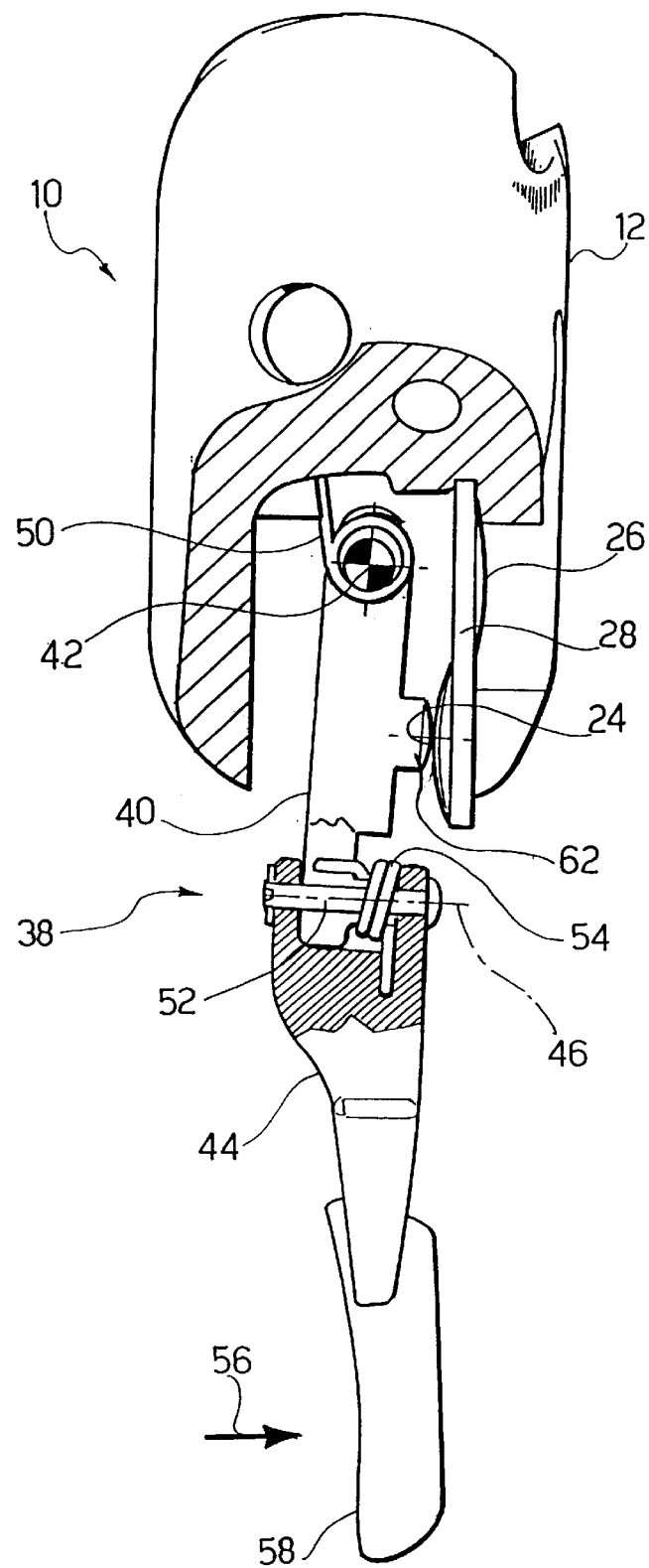
Figure 11:
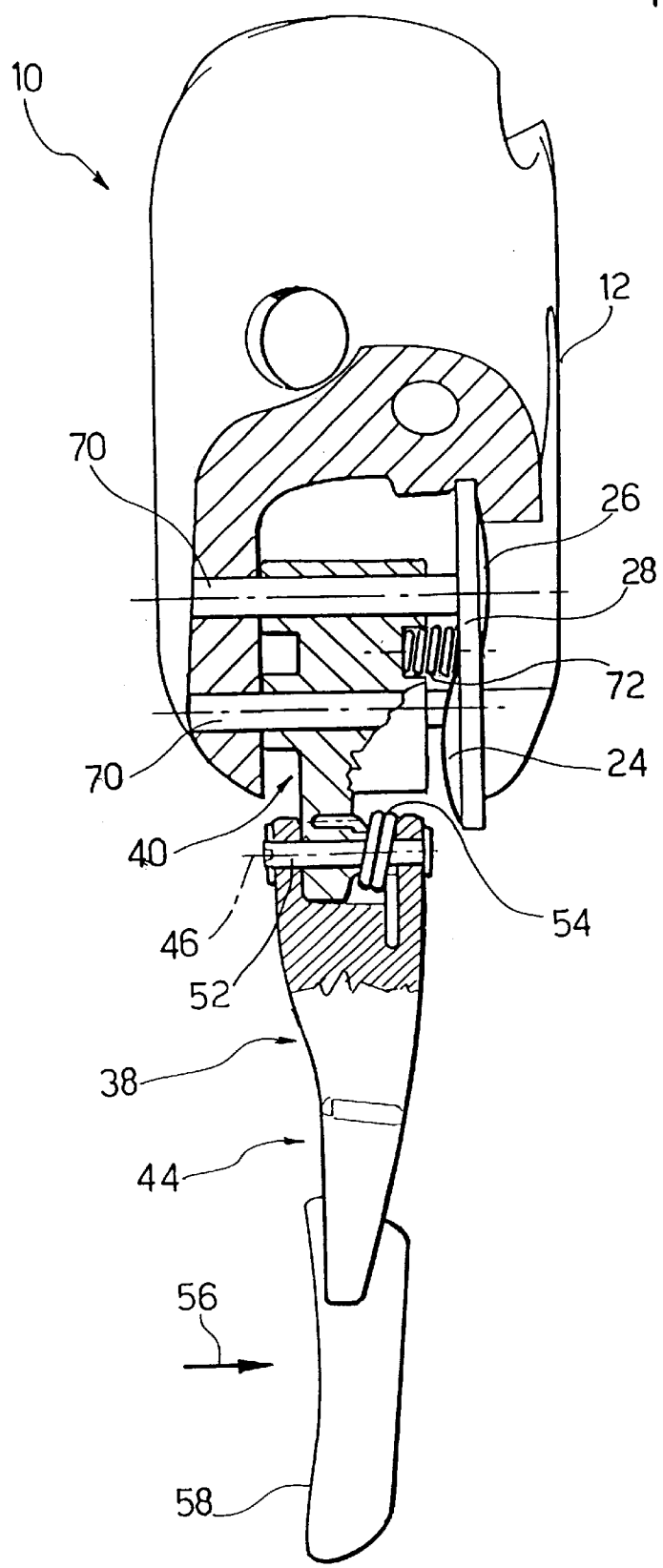
Figure 12:
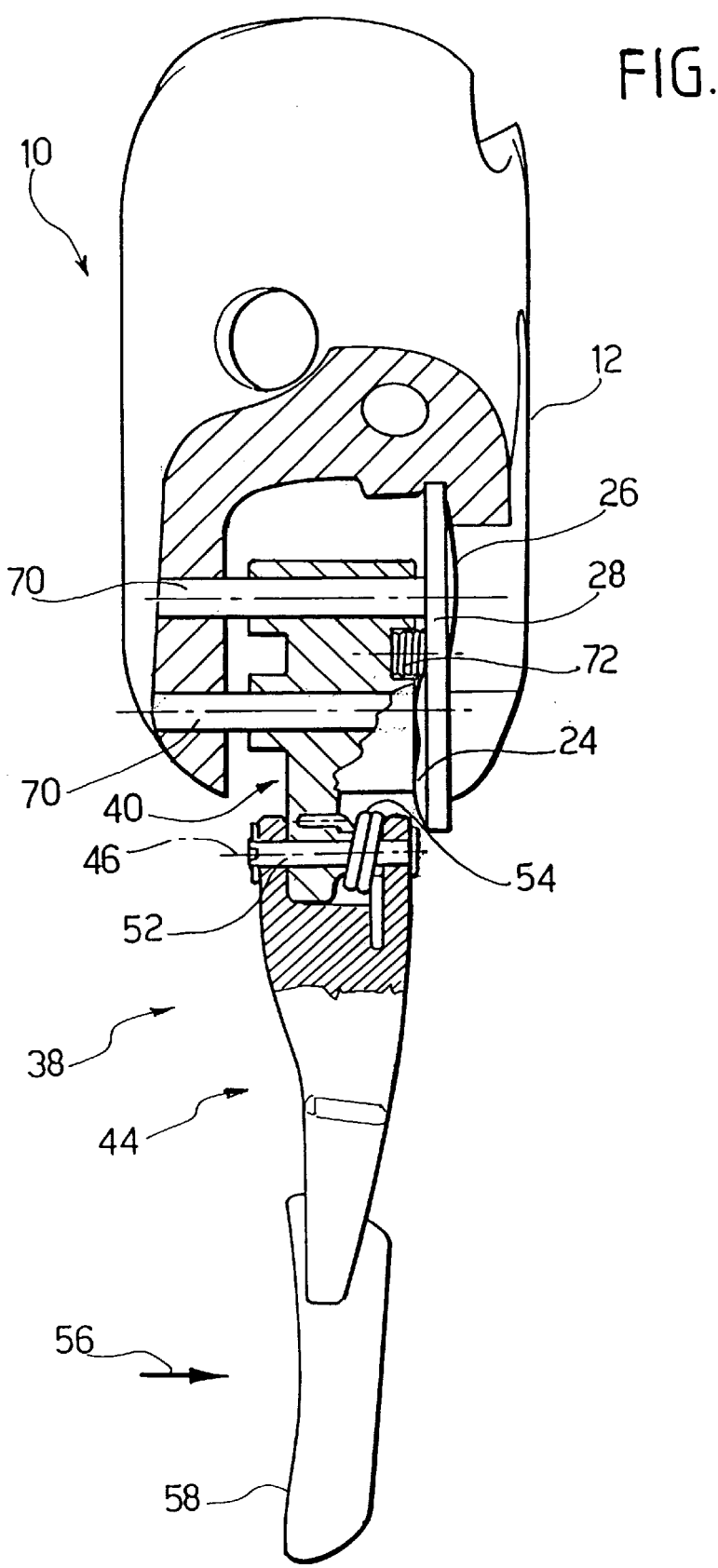
Figure 13:
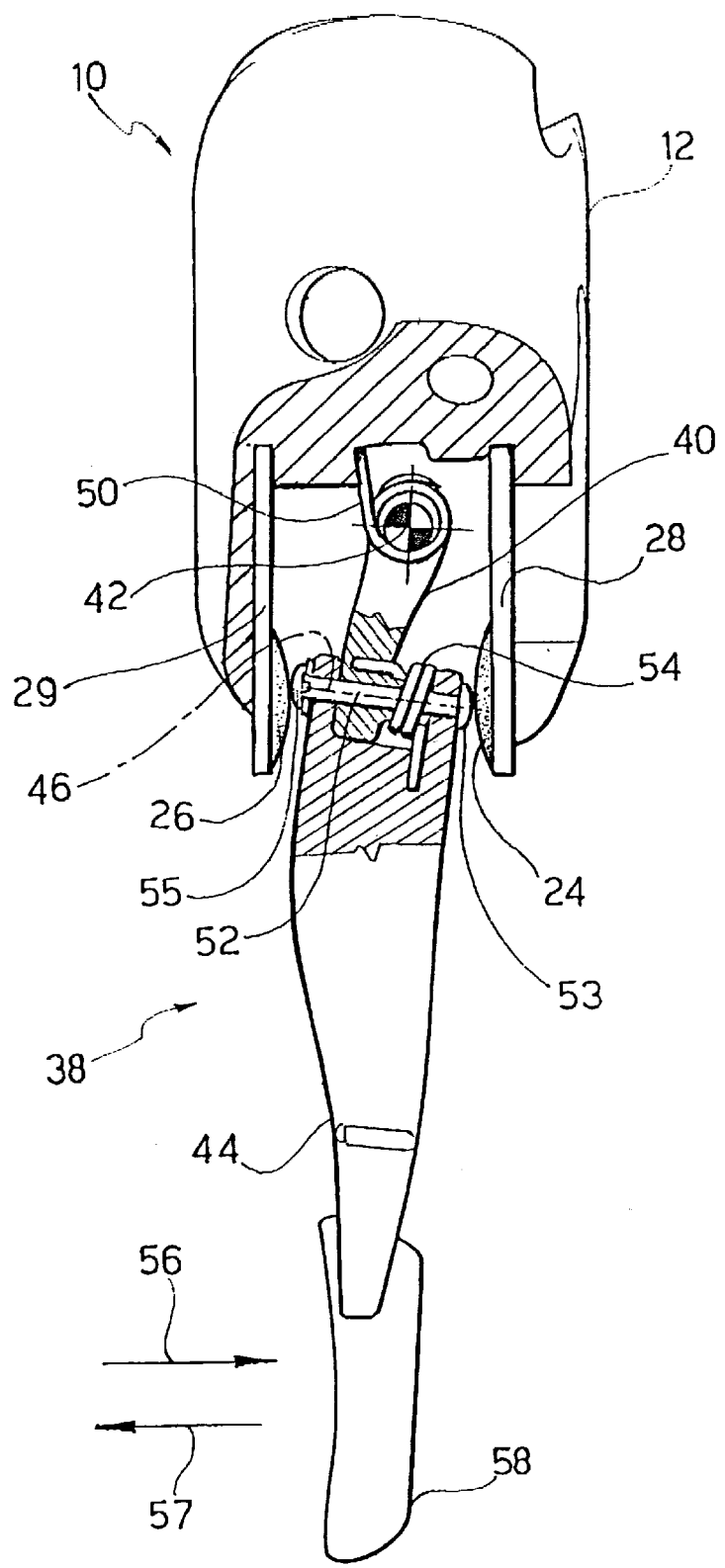
Figure 14:
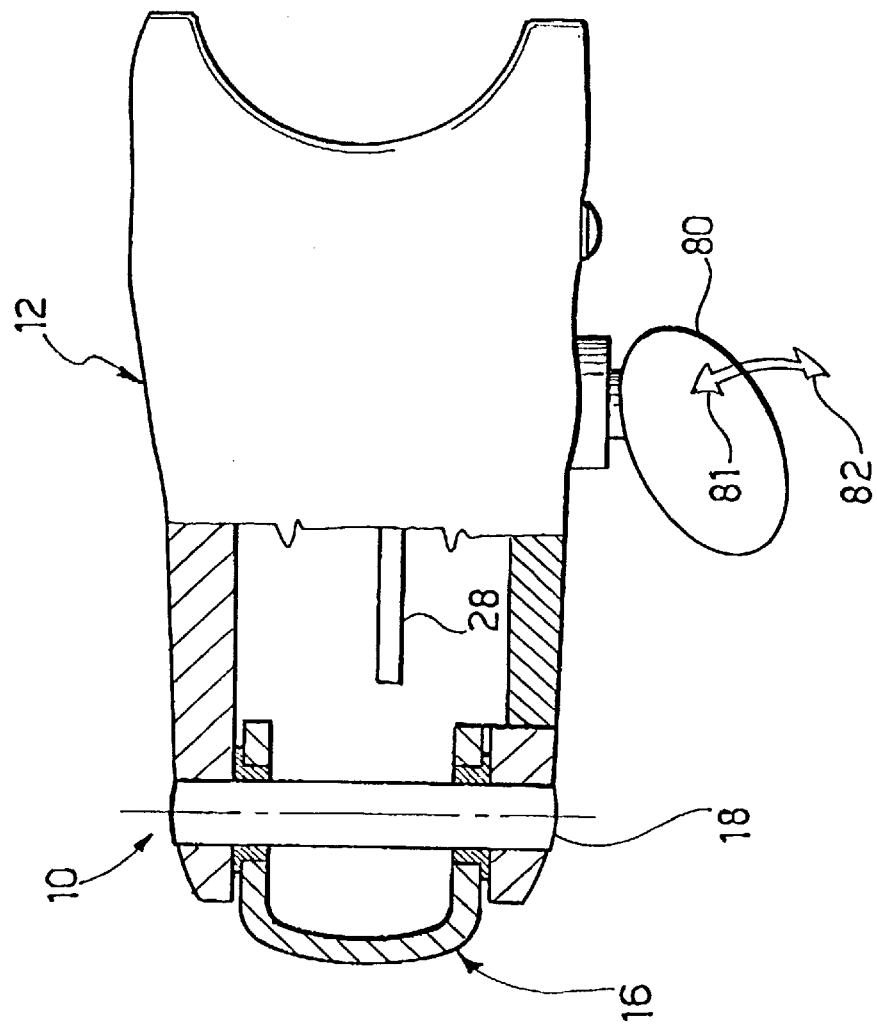

The present invention shall now be described in detail with reference to the accompanying drawings, provided purely as a non-limiting example, in which:

FIGS. 1 and 2 are sectional side views of a control device according to the present invention in two operating positions, FIGS. 3 and 4 are sections according to the line III—III in FIG. 1 in two operating positions, FIGS. 5 and 6 respectively show a second and a third variant of the solution illustrated in FIGS. 3 and 4, FIG. 7 shows a fourth variant of the solution according to the invention, FIG. 8 is a detail in a larger scale of the encircled part in FIG. 7, FIG. 9 shows the variant in FIG. 7 in the operating position, FIG. 10 is a detail in a larger scale of the encircled part in FIG. 9, FIG. 11 shows a fifth variant of the solution according to the invention, FIG. 12 shows the variant in FIG. 11 in the operating position, FIG. 13 is a section corresponding to FIG. 3 showing a variant of the solution according to FIG. 3, and FIG. 14 is a partially sectioned plan view of a further embodiment of the present invention.

With reference to FIGS. from 1 to 4, number 10 indicates an electric control device for a motor-driven derailleur for bicycles. The control device according to the present invention may be used to control a motor-driven gear change, for example of the type described in the U.S. Pat. No. 5,470,277 by the same Applicant.

The control device 10 comprises a supporting body 12 provided with means of conventional type for fixing it to a bicycle handlebar 14. The control device 10 comprises a brake control lever 16 hinged to the supporting body 12 by means of a pivot pin 18. One end 20 of a brake control cable 22 is fixed in a conventional manner to a top portion of the brake control lever 16. As can be seen in FIGS. 1 and 2, the brake control lever 16 may be made to pivot manually around the pivot pin 18 to control the brake of the bicycle, in an entirely conventional manner.

The supporting body 12 carries a pair of electric switches to control gear change, indicated with 24 and 26 in FIGS. 3 and 4. In accordance with a first embodiment of the invention, these switches are positioned on opposite faces of a supporting plate 28 fixed to the supporting body 12. The switches 24, 26 are microswitches per se known, including a body fixed to the supporting plate 28 and a mobile operating push button. The operating push buttons of the switches are covered by respective deformable membranes. In the Figures, the real switches are not visible and therefore the reference numbers 24, 26 used to distinguish the switches in fact indicate the deformable membranes of the switches. In the example of embodiment shown in the Figures, the supporting plate 28 also carries a third switch 30 (FIGS. 1 and 2) suitable to control a cycle computer (not shown).

The first switch 24 is provided for operating an electric motor for gear change (not shown) in a first direction for example to shift the chain towards higher speed gears (or upshifting). The second switch 26 is provided for operating the same gear change motor in the opposite direction, for example to shift the chain towards lower speed gears (or downshifting). The control device 10 may be used irrespectively to control the front derailleur or the rear derailleur of a bicycle. Therefore, in the control device positioned on the right side of the handlebar of the bicycle (normally used to control the rear derailleur) the switch 24 controls shift towards lower speed gears (that is towards gears with a larger number of teeth) and the switch 26 controls shift towards higher speed gears (gears with a smaller number of teeth). On the contrary, in the control device positioned on the left side of the handlebar, usually destined to control the front derailleur, the situation is reversed so that the switch 24 controls shift towards higher speed gears (towards a sprocket wheel with a larger number of teeth) and the switch 26 controls shift towards lower speed gears (towards a sprocket wheel with a smaller number of teeth).

In the embodiment according to FIGS. 1 to 4 the switch 26 facing the external side of the supporting body is preferably controlled by a push-button lever (indicated by the reference number 80 in FIG. 14) that can be pushed downwardly by the cyclist's thumb while the hand engages the supporting body 12 or the curved part of the handlebar 14, as described in the Italian patent application no. TO2000A000540 by the same applicant, not yet published on the filing date of the present application.

The control device 10 comprises a gear change lever (or control lever) 38 connected in a pivoting manner to the supporting body 12 and positioned immediately behind the brake control lever 16. The lever 38 is composed of two separate parts hinged together: an upper part 40 hinged to the supporting body 12 around a first axis 42 and a lower part 44 hinged to the upper part 40 around a second axis 46. The two pivotal axes 42, 46 are orthogonal or substantially orthogonal in relation to each other. In the embodiment shown in the figures, the first axis 42 extends along a substantially orthogonal direction in relation to the pivotal axis 18 of the brake control lever 16 and, consequently, the second pivotal axis 46 is parallel or substantially parallel in relation to the pivotal axis 18 of the brake control lever 16. Alternatively, this layout could be inverted so that the upper part 40 of the lever 38 is hinged to the supporting body 12 around an axis parallel or substantially parallel to the pivotal axis of the brake control lever while the lower part 44 of the lever 38 is hinged to the upper part 40 around an axis orthogonal to the pivotal axis of the brake control lever.

In the embodiment shown in FIGS. 1 to 4, the upper part 40 of the lever 38 is hinged to the supporting body 12 by means of a pin 48 which extends according to a direction substantially parallel in relation to the supporting plate 28 which carries the control switches of the gear change 24, 26. A first return spring 50 is associated with the upper part 40 of the lever 38 and tends to hold the lever 38 in the position at rest shown in FIG. 3. The lower part 44 and the upper part 40 of the lever 38 are hinged to each other by means of a pin 52. The pin 52 has a head 53 facing the switch 24. A second return spring 54 is positioned coaxially to the pin 52 and cooperates with the two parts 40, 44 of the lever 38. The spring 54 tends to push the second part 44 towards its position at rest shown in FIG. 1.

As can be seen by comparing FIGS. 1 and 2, when the control lever of the brake 16 pivots around its pivotal axis 18 to control braking, the first part 40 of the lever 38 remains motionless, while the second part 44 of the lever 38 pivots around the pivotal axis 46 and follows the movement of the brake control lever. When the brake control lever 16 is released, the second return spring 54 returns the second part 44 of the lever 38 to the position at rest in FIG. 1. To control gear change, the cyclist applies light pressure in the direction indicated by the arrow 56 in FIGS. 3 and 4 to a control portion 58 of the lever 38. Following this pressure, the lever 38 pivots around the first axis 42 as illustrated in FIG. 4 and the head 53 of the pin 52 operates the switch 24. When the cyclist releases the pressure on the control portion 58, the gear change lever 38 is returned to the position at rest shown in FIG. 3 under the return action of the spring 50. It can be noted that the pin 52 always remains facing the switch 24, even when the second part 44 of the lever 38 pivots around the axis 46 to follow the braking movement of the brake control lever 16. Therefore, the cyclist may control gear change by means of the lever 38 even while operating the brake control lever 16, as shown in FIG. 2.

In the variant shown in FIG. 5, the lower part 44 of the lever 38 has an operating portion 60 facing the switch 24 and the pin 52 is moved upwards in relation to the switch 24. In the variant shown in FIG. 6 the pin 52 is moved downwards in relation to the switch 24 and the upper part 40 of the lever 38 has an operating portion 62 facing the switch 24. Operation of the devices according to the variants in FIGS. 5 and 6 is identical to the operation described previously, the only variation being that the switch 24 is operated by the portions 60 and 62 as opposed to the head 53 of the pin 52.

The gear change lever 38 may be associated with a check device that limits the pivoting stroke of the lever 38, to avoid damages to the switch 24 in the case in which the lever 38 is pushed against the switch with excessive force. This check device may be produced as described in the Italian patent application no. TO2000A000540 by the same Applicant.

FIGS. 7 to 10 show an alternative embodiment of the control device according to the present invention. The parts corresponding to those previously described are indicated with the same reference numbers. In this embodiment, the upper part 40 of the gear change lever 38 is composed of an elastic element which may be used to shift the lower part 44 of the gear change lever 38 between the position at rest shown in FIGS. 7 and 8 and the operating position shown in FIGS. 9 and 10. The upper part 40 of the gear change lever 38 is preferably composed of an elastic lamina of metal material with a base 64 fixed to the support 12, for example by means of a screw 66. The lamina has an elastically deformable branch 68 at the lower end of which the lower part 44 is hinged by means of a pin 52. In the position at rest, the deformable branch 68 holds the lower part 44 in the position shown in FIGS. 7 and 8. When the cyclist applies pressure to the control portion 58 in the direction indicated by the arrows 56, the deformable branch 68 of the upper portion 40 becomes elastically deformed and allows the lower portion 44 to move towards the operating position shown in FIGS. 9 and 10. When the cyclist releases the pressure on the operating portion 58, the deformable branch 68 of the upper portion 40 elastically returns to its position at rest and returns the lower portion 44 of the gear change lever to the position at rest shown in FIGS. 7 and 8.

FIGS. 11 and 12 show a further embodiment of the control device according to the invention. In this case, the upper part 40 of the gear change lever 38 is composed of a block which slides in a direction parallel or substantially parallel in relation to the operating direction of the switch 24. In the embodiment shown in FIGS. 11 and 12, the block forming the upper part 40 is slidably mounted on a pair of guide elements 70 integral with the supporting body 12 and which extend in an orthogonal direction in relation to the plate 28 carrying the switches 24, 26. An elastic element 72, composed for example of a compressed helical screw, is interposed between the block and the plate 28 and tends to maintain the block in the position at rest shown in FIG. 11. At its lower end, the block forming the upper end 40 carries the pivot pin 52 around which the lower part 44 of the lever 38 is mounted pivotally. FIGS. 11 and 12 show the control device in the position at rest and in the operating position, respectively. As in the case described above, shift from the position at rest to the operating position is obtained by applying pressure on the control portion 58 and the lever 38 returns to the position at rest by the action of the spring 72 after releasing the pressure in the direction indicated by the arrow 56.

The described embodiments perform the upshifting and the downshifting by means of two levers (the control lever 38 and the push button lever 80). In accordance with a further aspect of the present invention, both said functions can be performed by a single lever.

As shown in FIG. 13, the first switch 24 can be mounted on a first plate 28 and the second switch 26 can be mounted on a second plate 29 facing the first plate 28. The pin 52 is preferably provided with a second head 55 facing the second switch 26. The control lever 38 is illustrated in a central rest position in which none of the two switches 24 or 26 is operated. The control lever 38 can be pivoted in a first direction 56 for operating the first switch 24 and in the opposite direction 57 to operate the second switch 26.

The control lever 38 can operate both the switches 24 and 26 also in the embodiments in accordance with FIGS. 5 to 12. In these embodiments the first switch 24 can be mounted on a first plate 28 and the second switch 26 can be mounted on a second plate 29 facing the first plate 28. Further, in the embodiments shown in FIGS. 5 and 6, the lower part 44 of the control lever 38 can present a second operating portion (not shown), opposite to the operating portion 60 and, respectively, 62 to operate the second switch 26. In the embodiment of FIGS. 7 to 10, the pin 52 can be provided with a second head 55, to operate the second switch 26 and in the embodiment of FIGS. 11 and 12 the block 40 of upper part of the control lever 38 can operate, with its opposing surfaces, both the switches 24 and 26.

As a further alternative of the present invention, as schematically indicated in FIG. 14, both the switches 24 and 26 can be operated by the push button lever 80. In the plan view of FIG. 14, the push button lever 80 is illustrated in a central rest position in which none of the two switches 24 or 26 is operated. The push button lever 80 can be pushed downwardly in the direction indicated by the arrow 82 to operate a first of said switches 24, 26 or pulled upwardly in the direction indicated by the arrow 81 to operate the other of said switches. The push button lever 80 can operate the switches 24 and 26 in any known manner, by means of either a pivotable or sliding movement, or any others kind of movement.

Naturally, without prejudice to the principle of the invention, the constructional details and embodiments may vary widely in relation to what is described and illustrated herein purely as an example, without however departing from the scope of the present invention as defined in the accompanying claims.

What is claimed is:

1. A control lever attached to a support body, mounted on a bicycle handlebar adjacent to a brake lever, for operating at least one switch of a bicycle electric device, said control lever is movable in at least two directions, and positioned so that movement in a first direction brings said lever into operating contact with said at least one switch and movement in a second direction has no operating influence on said at least one switch.

2. A control lever according to claim 1, wherein said at least two directions are substantially perpendicular to each other.

3. A control lever according to claim 1, wherein said lever is movable in a third direction and positioned so that movement of the lever in a third direction brings said lever into operating contact with a second switch.

4. A control lever according to claim 1, wherein said movement in the first direction for operating said first switch is performed by a first lever part and said movement in a second direction having no influence on said first switch is performed by a second lever part.

5. A control lever according to claim 3, wherein said movement in a third direction for bringing said lever into operating contact with said second switch is performed by a first lever part.

6. A control lever according to claim 5, wherein a second lever part is movable with respect to said first lever part.

7. A control lever according to claim 6, wherein said first lever part is fixed to a supporting body of said bicycle.

8. A control lever according to claim 6, wherein said second lever part is articulated on said first lever part around a pivoting axis.

9. A control lever according to claim 8, wherein said first lever part acts on said first switch by pivoting around a second axis in the first direction.

10. A control lever according to claim 9, wherein said first lever part acts on said second switch by pivoting around said second axis in a second direction.

11. A control lever according to claim 10, wherein said first pivoting axis is substantially perpendicular with respect to said first axis.

12. A control lever according to claim 9 further comprising an articulation pin having a head for operating said first switch.

13. A control lever according to claim 12, wherein said articulation pin has two opposite heads for operating, respectively, said first and said second switch, respectively.

14. A control lever according to claim 8 further comprising elastic means operatively associated between the first lever part and the second lever part.

15. A control lever according to claim 8, wherein the first lever part comprises an elastically deformable element.

16. A control lever according to claim 8, wherein the first lever part acts on said first switch by means of sliding means.

17. A control lever according to claim 8, wherein the first lever part acts on said first switch by means of elastic means.

18. A control lever according to claim 3, wherein the lever is provided with at least one operating portion for operating at least one of said switches.

19. A control lever according claim 18, wherein a second lever part is provided with at least one operating portion for operating at least one of said switches.

20. A control lever according to claim 1, wherein said at least one switch controls the gear change of a bicycle.

21. A control lever according to claim 1, wherein said lever is positioned behind a bicycle brake lever.

22. A control lever according to claim 21, wherein said second movement which does not influence the switch is the braking movement of the brake lever.

23. An electric control device for a motor-driven derailleur for bicycles, comprising a supporting body provided with means for fixing the supporting body to a bicycle handlebar and a first switch for controlling an upshift of a gear and a second switch for controlling a down shift of a gear, wherein both of said electric switches are operated by a single lever attached to the support body.

24. Electric control device according to claim 23, wherein said single lever presents a central rest position in which none of said electric switches is operated.

25. Electric control device according to claim 24, wherein said single lever operates one of said electric switches when moved in a first direction and operates the other of said electric switches when moved in the substantially opposed direction.

26. Electric control device according to claim 23, wherein said single lever is hinged on said supporting body.

27. Electric control device according to claim 23, wherein said single lever is hinged on a bicycle brake control lever.

28. Electric control device according to claim 23, wherein said single lever is a control lever positioned behind a bicycle brake control lever.

29. Electric control device according to claim 26, wherein said single lever is a push button lever positioned substantially perpendicular to a brake control lever of the bicycle.

30. An electric control device for a motor-driven derailleur for bicycles, comprising:
   a supporting body provided with means for fixing it to a bicycle handlebar,
   a pair of electric switches to control the gear change, carried by the supporting body, and
   a gear change lever that can be operated manually to control at least one of said switches,
   wherein the gear change lever comprises:
      a first part connected to the supporting body in order to allow shift of the gear change lever between a position at rest and an operating position of said first switch, and
      a second part hinged to the first part.

31. Device according to claim 30, wherein said first part is hinged to the supporting body around an axis orthogonal or substantially orthogonal in relation to a pivotal axis between the first part and the second part.

32. Device according to claim 30, wherein said first part comprises an elastically deformable element.

33. Device according to claim 32, wherein said elastically deformable element comprises a metal lamina with a base fixed to the supporting body and an elastically deformable branch hinged to which is the second part.

34. Device according to claim 30, wherein said first part comprises a block mounted slidably in relation to the supporting body along a rectilinear direction.

35. Device according to claim 30, wherein said block is mounted slidably on guide means carried by the supporting body.

36. Device according to claim 35 further comprising elastic means tending to push said block towards a rest position.

37. Device according to claim 31, wherein one of said axes is parallel or substantially parallel to the pivotal axis of a brake control lever.

38. Device according to claim 37, wherein the pivotal axis between the first and the second part is parallel or substantially parallel to a pivotal axis of the bicycle brake control lever.

39. Device according to claim 30, wherein the first and the second part of the gear change lever are hinged to each other by means of a pin with at least one head facing at least one of said switches.

40. Device according to claim 30, wherein the second part of the gear change lever has an operating portion facing at least one of said switches.

41. Device according to claim 30, wherein the first part of the gear change lever has an operating portion facing at least one of said switches.

42. Device according to claim 30 further comprising a return spring operatively positioned between the supporting body and the first part of the gear change lever.

43. Device according to claim 42 further comprising a second return spring operatively positioned between the first and the second part of the gear change lever.

44. Device according to claim 30, further comprising a third electric switch suitable to control operation of a cycle computer.

45. Device according to claim 30, wherein said electric switches are mounted on a supporting plate in turn mounted on the supporting body.

46. Device according to claim 45, wherein the aforesaid electric switches are positioned on opposite faces of said supporting plate.

47. Device according to claim 30, wherein said gear change lever is movable in a first direction to operate a first switch and in a second direction to operate a second switch.

48. Device according to claim 30, wherein said switches are mounted on opposite sides with respect to the gear change lever.

49. Device according to claim 48, wherein said switches are mounted on respective plates facing each other.

50. Device according to claim 30, wherein said gear control lever is positioned behind a brake control lever hinged to the supporting body.

* * * * *

UNITED STATES PATENT AND TRADEMARK OFFICE
CERTIFICATE OF CORRECTION

PATENT NO. : 6,698,567 C1  Page 1 of 1
APPLICATION NO. : 95/000044
DATED : March 2, 2004
INVENTOR(S) : Giuseppe Dal Pra'

It is certified that error appears in the above-identified patent and that said Letters Patent is hereby corrected as shown below:

In claim 52, at col. 5, line 37, after the word "handlebar," insert --a pair of electric switches to control a gear change, fixed to the supporting body, and--.

Signed and Sealed this

Twenty-ninth Day of December, 2009

David J. Kappos
*Director of the United States Patent and Trademark Office*

(12) INTER PARTES REEXAMINATION CERTIFICATE (0042nd)
United States Patent
Pra'

(10) Number: US 6,698,567 C1
(45) Certificate Issued: Dec. 2, 2008

(54) ELECTRIC CONTROL DEVICE FOR A MOTOR-DRIVEN DERAILLEUR FOR BICYCLES

(75) Inventor: Giuseppe Dal Pra', Zane (IT)

(73) Assignee: Campagnolo SRL, Vicenza (IT)

Reexamination Request:
No. 95/000,044, Jun. 3, 2004

Reexamination Certificate for:
Patent No.: 6,698,567
Issued: Mar. 2, 2004
Appl. No.: 10/165,117
Filed: Jun. 7, 2002

(30) Foreign Application Priority Data

Jun. 8, 2001 (IT) .................................... TO2001A0555

(51) Int. Cl.
*B62M 25/08* (2006.01)
*B62M 25/04* (2006.01)
*B62M 25/00* (2006.01)

(52) U.S. Cl. ....................... 192/217; 192/226; 74/502.2; 74/489

(58) Field of Classification Search .................. 200/512
See application file for complete search history.

(56) References Cited

U.S. PATENT DOCUMENTS

| 4,071,892 | A | * | 1/1978 | Genzling | 701/200 |
|---|---|---|---|---|---|
| 4,143,557 | A | * | 3/1979 | Wakebe et al. | 474/80 |
| 4,946,425 | A | * | 8/1990 | Buhlmann | 474/80 |
| 5,358,451 | A | * | 10/1994 | Lacombe et al. | 474/78 |
| 5,470,277 | A |  | 11/1995 | Romano |  |
| 5,479,776 | A | * | 1/1996 | Romano | 74/502.2 |
| 5,480,356 | A | * | 1/1996 | Campagnolo | 474/70 |
| 5,494,307 | A | * | 2/1996 | Anderson | 280/236 |
| 5,514,041 | A | * | 5/1996 | Hsu | 474/78 |
| 5,653,649 | A | * | 8/1997 | Watarai | 474/78 |
| 5,728,017 | A | * | 3/1998 | Bellio et al. | 474/70 |
| 5,819,916 | A | * | 10/1998 | Lee | 200/557 |
| 5,865,454 | A | * | 2/1999 | Campagnolo | 280/238 |
| 6,015,036 | A | * | 1/2000 | Fukuda | 192/217 |
| 6,073,730 | A |  | 6/2000 | Abe |  |
| 6,216,078 | B1 |  | 4/2001 | Jinbo et al. |  |

FOREIGN PATENT DOCUMENTS

| CN | 2268001 Y | 11/1997 |
|---|---|---|
| JP | 5097088 | 4/1993 |
| JP | 7047987 | 2/1995 |
| JP | 10230888 | 9/1998 |
| JP | 200011812 | 1/2000 |
| JP | 200057898 | 2/2000 |
| JP | 2530705 | 12/2006 |

\* cited by examiner

*Primary Examiner*—Rodney H Bonck

(57) ABSTRACT

An electric control device for a motor-driven derailleur for bicycles includes a supporting body fixed to a handlebar of a bicycle, a supporting body, a pair of electric switches to control the gear change carried by the supporting body, and a gear change lever that can be manually operated to control a first of said switches. The gear change lever comprises a first part connected to the supporting body so as to consent shift of the gear change lever between a position at rest and an operating position, and a second part hinged to the first part.

At the time of issuance and publication of this certificate, the patent remains subject to pending reissue application No. 11/366,984 filed Mar. 2, 2006. The claim content of the patent may be subsequently revised in the reissue proceeding.

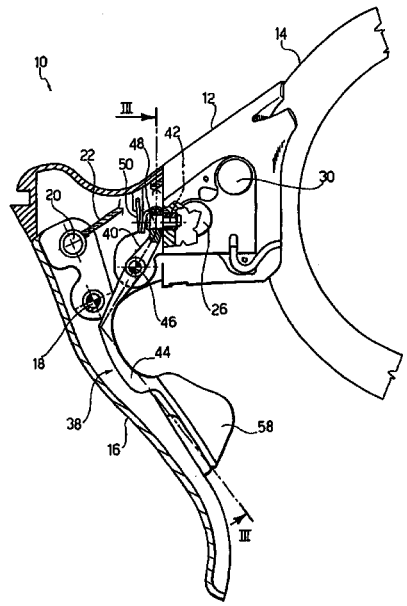

1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–8, 15, 18–29 and 43 are cancelled.

Claims 9, 11–14, 16, 17, 30, 31, 33–35, 37, 39–41, 45, 46 and 48 are determined to be patentable as amended.

Claims 10, 32, 36, 38, 42, 44, 47, 49 and 50, dependent on an amended claim, are determined to be patentable.

New claims 51, 52 and 53 are added and determined to be patentable.

9. [A control lever according to claim 8,] *A control lever attached to a support body, mounted on a bicycle handlebar adjacent to a brake lever, for operating at least one switch of a bicycle electric device, said control lever is movable in at least two directions, and positioned so that movement in a first direction brings said lever into operating contact with said at least one switch and movement in a second direction has no operating influence on said at least one switch;*
   wherein said lever is movable in a third direction and positioned so that movement of the lever in a third direction brings said lever into operating contact with a second switch;
   wherein said movement in a third direction for bringing said lever into operating contact with said second switch is performed by a first lever part;
   wherein a second lever part is movable with respect to said first lever part;
   wherein said second lever part is articulated on said first lever part around a first axis; and
   wherein said first lever part acts on said first switch by pivoting around a second axis in the first direction, *wherein the first axis and the second axis are offset from each other.*

11. [A control lever according to claim 10,] *A control lever attached to a support body, mounted on a bicycle handlebar adjacent to a brake lever, for operating at least one switch of a bicycle electric device, said control lever is movable in at least two directions, and positioned so that movement in a first direction brings said lever into operating contact with said at least one switch and movement in a second direction has no operating influence on said at least one switch,*
   wherein said lever is movable in a third direction and positioned so that movement of the lever in a third direction brings said lever into operating contact with a second switch,
   wherein a second lever part is movable with respect to a first lever part,
   wherein said second lever part is articulated on said first lever part around a first axis,
   wherein said first lever part acts on said second switch by pivoting around said second axis in a second direction, and
   wherein said [first pivoting] *second* axis is substantially perpendicular with respect to said first axis.

12. A control lever according to claim 9 further comprising an articulation pin *about which the control lever articulates, and* [having] a head *on said pin* for operating said first switch.

13. [A control lever according to claim 12.] *A control lever attached to a support body, mounted on a bicycle handlebar adjacent to a brake lever, for operating at least one switch of a bicycle electric device, said control lever is movable in at least two directions, and positioned so that movement in a first direction brings said lever into operating contact with said at least one switch and movement in a second direction has no operating influence on said at least one switch, comprising an articulation pin having a head for operating said first switch,*
   wherein said lever is movable in a third direction and positioned so that movement of the lever in a third direction brings said lever into operating contact with a second switch,
   wherein said movement in a third direction for bringing said lever into operating contact with said second switch is performed by a first lever part,
   wherein a second lever part is movable with respect to said first lever part,
   wherein said second lever part is articulated on said first lever part around a first axis,
   wherein said first lever part acts on said first switch by pivoting around a second axis in the first direction, and
   wherein said articulation pin has two opposite heads for operating, respectively, said first and said second [switch] *switches*, respectively.

14. A control lever according to claim [8] *9* further comprising [elastic means] *a torsional spring* operatively associated between the first lever part and the second lever part.

16. [A control lever according to claim 8,] *A control lever attached to a support body, mounted on a bicycle handlebar adjacent to a brake lever, for operating at least one switch of a bicycle electric device, said control lever is movable in at least two directions, and positioned so that movement in a first direction brings said lever into operating contact with said at least one switch and movement in a second direction has no operating influence on said at least one switch;*
   wherein said lever is movable in a third direction and positioned so that movement of the lever in a third direction brings said lever into operating contact with a second switch;
   wherein said movement in a third direction for bringing said lever into operating contact with said second switch is performed by a first lever part;
   wherein a second lever part is movable with respect to said first lever part;
   wherein said second lever part is articulated on said first lever part around a first axis;
   wherein the first axis and the second axis are offset from each other; and
   wherein the first lever part acts on said first switch by [means of sliding means] *a means for sliding the first lever part.*

17. [A control lever according to claim 8,] *A control lever attached to a support body, mounted on a bicycle handlebar adjacent to a brake lever, for operating at least one switch of* a bicycle electric device, said control lever is movable in at least two directions, and positioned so that movement in a first direction brings said lever into operating contact with said at least one switch and movement in a second direction has no operating influence on said at least one switch;

wherein said lever is movable in a third direction and positioned so that movement of the lever in a third direction brings said lever into operating contact with a second switch;

wherein said movement in a third direction for bringing said lever into operating contact with said second switch is performed by a first lever part;

wherein a second lever part is movable with respect to said first lever part;

wherein said second lever part is articulated on said first lever part around a first axis;

wherein the first axis and the second axis are offset from each other; and wherein the first lever part acts on said first switch by means of elastic means *for biasing the first lever part away from the first switch*.

30. An electric control device for a motor-driven derailleur for bicycles, comprising:

a supporting body provided with means for fixing it to a bicycle handlebar, a pair of electric switches to control the gear change, carried by the supporting body, and a gear change lever that can be operated manually to control at least one of said switches, wherein the gear change lever comprises:

a first part connected to the supporting body in order to allow shift of the gear change lever between a position at rest and an operating position of said first switch, and a second part hinged to the first part *about a pin, with the first part and second parts contacting a torsion spring that is mounted on the pin*.

31. Device according to claim 30, wherein said first part is hinged to the supporting body around an axis orthogonal or substantially orthogonal in relation to a pivotal axis [between the first part and the second part] *of the pin*.

33. [Device according to claim 32.] *An electric control device for a motor-driven derailleur for bicycles, comprising:*

*a supporting body provided with means for fixing it to a bicycle handlebar,*

*a pair of electric switches to control the gear change, carried by the supporting body, and*

*a gear change lever that can be operated manually to control at least one of said switches,*

*wherein the gear change lever comprises:*

*a first part connected to the supporting body in order to allow shift of the gear change lever between a position at rest and an operating position of said first switch, and*

*a second part hinged to the first part,*

*wherein said first part comprises an elastically deformable element comprising* [wherein said elastically deformable element comprises] *a metal lamina with a base fixed to the supporting body and an elastically deformable branch hinged to which is the second part.*

34. [Device according to claim 30.] *An electric control device for a motor-driven derailleur for bicycles, comprising:*

*a supporting body provided with means for fixing it to a bicycle handlebar,*

*a pair of electric switches to control the gear change, carried by the supporting body, and*

*a gear change lever that can be operated manually to control at least one of said switches,*

*wherein the gear change lever comprises:*

*a first part connected to the supporting body in order to allow shift of the gear change lever between a position at rest and an operating position of said first switch, and*

*a second part hinged to the first part,*

*wherein said first part comprises a block mounted slidably in relation to the supporting body along a rectilinear direction.*

35. Device according to claim [30] *34*, wherein said block is mounted slidably on guide means carried by the supporting body.

37. [Device according to claim 31.] *An elastic control device for a motor-driven derailleur for bicycles, comprising:*

*a supporting body provided with means for fixing it to a bicycle handlebar,*

*a pair of electric switches to control the gear change, carried by the supporting body, and*

*a gear change lever that can be operated manually to control at least one of said switches,*

*wherein the gear change lever comprises:*

*a first part connected to the supporting body in order to allow shift of the gear change lever between a position at rest and an operating position of said first switch, and*

*a second part hinged to the first part about a pin, with the first part and second parts contacting a torsion spring that is mounted on the pin,*

*wherein said first part is hinged to the supporting body around an axis orthogonal or substantially orthogonal in relation to a pivotal axis of the pin, and*

*wherein one of said axes is parallel or substantially parallel to* and offset from *the pivotal axis of a brake control lever.*

39. Device according to claim 30, wherein the [first and the second part of the gear change lever are hinged to each other by means of a] pin [with] *has* at least one head facing *and capable of contacting* at least one of said switches.

40. Device according to claim 30, wherein the second part of the gear change lever has an operating portion facing *and capable of contacting* at least one of said switches.

41. Device according to claim 30, wherein the first part of the gear change lever has an operating portion facing *and capable of contacting* at least one of said switches.

45. Device according to claim 30, wherein said electric switches are mounted on a supporting plate [in turn mounted on] *in contact with* the supporting body.

46. [Device according to claim 45.] *An electric control device for a motor-driven derailleur for bicycles, comprising:*

*a supporting body provided with means for fixing it to a bicycle handlebar,*

*a pair of electric switches to control the gear change, carried by the supporting body, and*

*a gear change lever that can be operated manually to control at least one of said switches,*

*wherein the gear change lever comprises:*

*a first part connected to the supporting body in order to allow shift of the gear change lever between a position at rest and an operating position of said first switch, and* a second part hinged to the first part,
wherein said electric switches are positioned and mounted on opposite faces of a supporting plate in turn mounted on the supporting body [wherein the aforesaid electric switches are positioned on opposite faces of said supporting plate].

48. [Device according to claim 30.] *An electric control device for a motor-driven derailleur for bicycles, comprising:*

*a supporting body provided with means for fixing it to a bicycle handlebar,*

*a pair of electric switches to control the gear change, carried by the supporting body, and*

*a gear change lever that can be operated manually to control at least one of said switches,*

*wherein the gear change lever comprises:*

*a first part connected to the supporting body in order to allow shift of the gear change lever between a position at rest and an operating position of said first switch, and*

*a second part hinged to the first part about a pin, with the first part and second parts contacting a torsion spring that is mounted on the pin;*

*wherein said switches are mounted on opposite sides with respect to the gear change lever.*

51. *A control lever attached to a support body, mounted on a bicycle handlebar adjacent to a brake lever, for operating at least one switch of a bicycle electric device, said control lever is movable in at least two directions, and positioned so that movement in a first direction brings said lever into operating contact with said at least one switch, while movement in a second direction has no operating influence on said at least one switch, and movement in said second direction does not move said at least one switch.*

52. *An electric control device for a motor-driven derailleur for bicycles, comprising:*

*a supporting body provided with means for fixing it to a bicycle handlebar,*

*a gear change lever that can be operated manually to control at least one of said switches,*

*wherein the gear change lever comprises:*

*a first part connected to the supporting body in order to allow shift of the gear change lever between a position at rest and an operating position of said first switch, and*

*a second part hinged to the first part about a pin, wherein movement of the second part about an axis of the pin has no effect on either of the pair of switches.*

53. *A control lever attached to a support body, mounted on a bicycle handlebar adjacent to a brake lever, for operating at least one switch of a bicycle electric device, said control lever is movable in at least two directions, and positioned so that movement in a first direction brings said lever into operating contact with said at least one switch and movement in a second direction has no operating influence on said at least one switch, comprising an articulation pin having a head for operating said first switch,*

*wherein said lever is movable in a third direction and positioned so that movement of the lever in a third direction brings said lever into operating contact with a second switch,*

*wherein said movement in said third direction for bringing said lever into operating contact with said second switch is performed by a first lever part,*

*wherein a second lever part is movable with respect to said first lever part*

*wherein said second lever part is articulated on said first lever part around a first axis,*

*wherein said first lever part acts on said first switch by pivoting around a second axis in the first direction, and*

*wherein said articulation pin has two opposite heads for operating at least one of said first and said second switches.*

\* \* \* \* \*